March 3, 1970  J. J. DE SANTO  3,498,397
BEAMLESS ELECTRICAL WEIGHING DEVICES
Filed Jan. 13, 1969
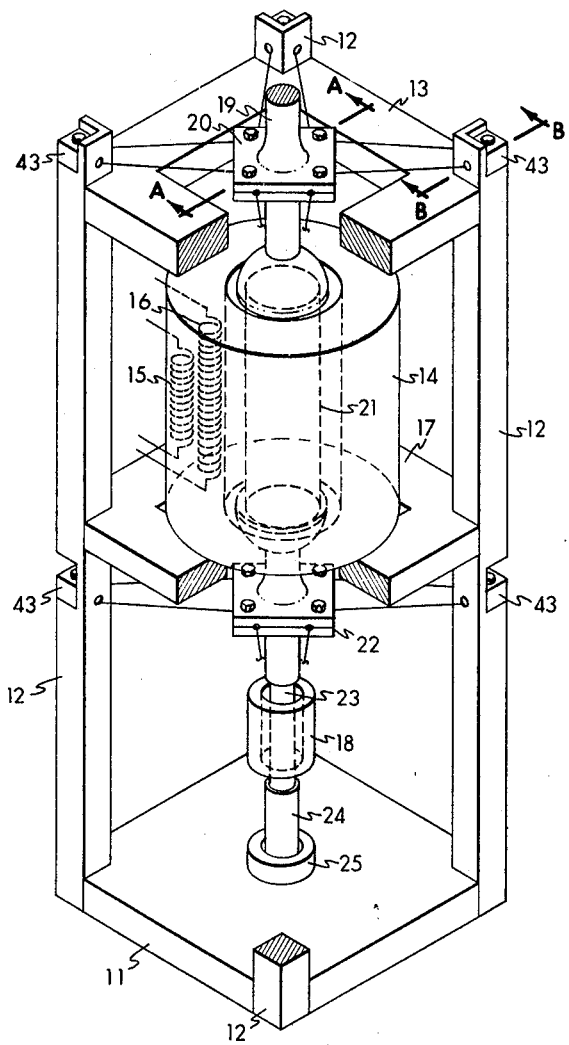
FIGURE I
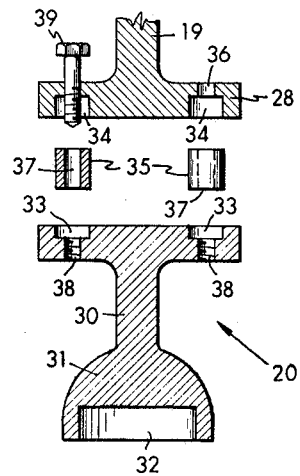
FIGURE II
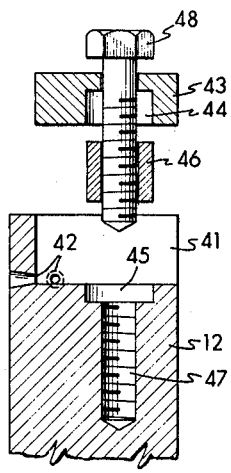
FIGURE III
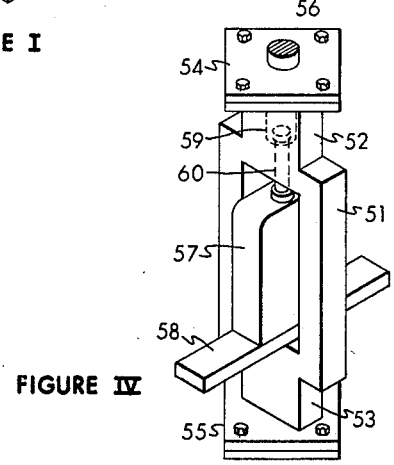
FIGURE IV
Joseph J. De Santo INVENTOR
BY Henry M. Feiyer
ATTORNEY

3,498,397
Patented Mar. 3, 1970

3,498,397
BEAMLESS ELECTRICAL WEIGHING DEVICES
Joseph J. De Santo, Neshanic, N.J., assignor to Thomas Russell et al., known and operating as Intec, East Millstone, N.J.
Filed Jan. 13, 1969, Ser. No. 790,802
Int. Cl. G01g *3/15, 21/24*
U.S. Cl. 177—210                           10 Claims

ABSTRACT OF THE DISCLOSURE

Beamless electrical weighing devices comprising a central assembly for supporting the weighing pan have been improved by attaching said central support assembly to the structural frame of the weighing device by means of guy wires in at least two, spaced, horizontal planes to prevent lateral or horizontal movement of said support assembly and thereby maintaining the axis of the support assembly perpendicular to said planes while permitting limited vertical movement thereof when objects are placed on the weighing pan. Such vertical movement actuates suitable displacement sensors which transform such vertical movement into an electrical signal which is directly proportional to the weight of the object placed on the weighing pan. Accuracy and durability of the weighing device is improved by the use of such guy wires rather than spiral or leaf springs or any sleeve-type guide members which produce friction in preventing lateral movement of the weighing pan support assembly.

---

This invention relates to weighing devices or balances and particularly to weighing devices or balances which do not use torsion members or a beam which pivots about a knife edge or jeweled bearings. More particularly this invention concerns such beamless balances which measure the weight of an object rapidly and accurately by means of displacement sensors which transform the vertical movement of the weighing pan support assembly into an electrical signal which is directly proportional to the weight of the object placed on the weighing pan.

Beamless electrical or electromagnetic weighing devices or systems have been known for some time. However, previous devices of this type have been deficient either in accuracy and/or speed of weighing or in a general lack of sturdiness so essential in such devices. Baur U.S. Patent No. 3,322,222, a recent patent for weighing devices similar to the present invention, proposes to utilize "two flat, highly flexible leaf-springs 5 that permit free vertical motion but restrict all sidewise motions." It is obvious, however, that some lateral movement of the coil in the magnetic field as well as of the movable core in the displacement transducer of the Baur devices cannot be avoided when such flexible leaf-springs are used. Such lateral movement is accentuated in top loading weighing devices if the object being weighed is off-center of the weighing pan or is a live object that moves during the weighing procedure. Such lateral movement, even though it may be quite small, is sufficient to impair the accuracy of the weighing device.

It is the object of this invention to provide beamless electrical weighing devices which measure weight rapidly and accurately.

It is also an object of this invention to provide beamless electrical weighing devices which not only measure weight rapidly and accurately but also possess sufficient sturdiness to maintain their weighing accuracy and efficiency for prolonged periods.

More specifically it is the object of this invention to provide beamless electrical weighing devices of improved accuracy and durability, particularly in top loading weighing devices, by utilizing guy wires to secure the weighing pan support assembly to the structural frame of the weighing device in such a way as to prevent horizontal or lateral movement of said support assembly while permitting limited vertical movement thereof.

These and other objects, features and advantages will appear more clearly to those skilled in the art from the following detailed description of this invention.

In general, the present invention contemplates securing the weighing pan support assembly centrally of the structural frame of beamless electrical weighing devices by firmly attaching guy wires to said support assembly and the structural frame of the weighing device on at least two, spaced horizontal-planes. Such guy wires, properly positioned and firmly attached to the structural frame of the weighing device and to the weighing pan support assembly, not only prevent horizontal movement of said support assembly thereby maintaining the axis thereof perpendicular but also prevent very slight rotary motion of the weighing pan support assembly that tends to occur if the object being weighed is off-center or moves on the weighing pan during the weighing procedure. The use of guy wires, in accordance with the present invention, permits limited vertical movement of the weighing pan support assembly when an object is placed on the weighing pan without the lateral movement that is unavoidable with leaf-springs used in the Baur patent and without creating errors due to friction that would be unavoidable if sleeve-type guide members were used to prevent lateral movement of the support assembly.

The vertical movement of the weighing pan support assembly actuates suitable electronic displacement sensors which transform such vertical movement into an electrical signal which is directly proportional to the weight of the object placed on the weighing pan. The guy wire arrangement of the present invention can be used in both static and current restoration or electromagnetic weighing devices. In a static system the electrical signal may be passed through a scaling amplifier and thence too a digital voltmeter for indicating or recording the weight. In a current restoration or electromagnetic system, the electrical signal is a measure of the current that must be supplied to a force coil to return a central core or magnet on the weighing pan support assembly to its original or null position with suitable means for indicating and/or recording the weight.

This invention can be used through all ranges of weighing and with particular advantage wherever top loading weighing must be accomplished. While the principles herein described are true at any weighing range, the size of all components must be scaled in accordance with the weighing range of the particular system. Moreover, while it may be impractical to use a current restoration or electromagnetic system for heavy weight, it is possible to use the present invention in static, higher weight range systems with a transducer or load cell as the displacement sensor and thereby reduce torque due to off-center loading by many magnitudes. In higher weight range systems, bearings or the like are sometimes used to hold the weight support assembly properly in line with the load cell. However, off-center weight readings will vary and limit the precision of such systems to two significant places. With the guy wire arrangement of the present invention, however, precision to four significant places is obtainable with the only limitation being the capacity of the transducer or load cell itself. With the guy wire arrangement of the present invention it is also possible to determine very small weights with beamless, static and current restoration or electromagnetic weighing devices. Weights as small as micrograms can be determined therewith if transducers sensitive enough to detect extremely small movements of the weighing pan support assembly are available.

The present invention will be more clearly understood and the advantages thereof fully realized from the following description when read in conjunction with the accompanying drawings in which:

FIGURE I is a perspective view, partially broken, of a weighing device employing guy wires for attaching the central weighing pan support assembly to the structural frame of the weighing device in accordance with this invention.

FIGURE II is a vertical cross section, on the line A—A of FIGURE I, of the guy wire clamp for the central weighing pan support assembly with the several parts separated.

FIGURE III is a vertical cross section, on the line B—B of FIGURE I, of a guy wire clamp on the structural frame.

FIGURE IV is a perspective view of a central weighing pan support assembly of a weighing device employing a load cell.

Referring to FIGURE I, the weighing device comprises a structural frame for supporting the various parts of the central weighing pan support assembly and associated components and normally consists of a base 11 to which suitable rigid vertical members 12 are secured. One or more frames 13 are attached to the vertical members 12 to impart the desired rigidity to the structural frame particularly adjacent those sections where guy wires are attached. A force coil 14 having an outer zero or "null" coil 15 and an inner answer coil 16 is attached to the structural frame as by means of the open platform or frame 17 to maintain said coils in a desired fixed position. A displacement sensor 18 is rigidly attached to the structural frame with its axis in alignment with the axis of the force coil 14.

The weighing pan, not shown, is attached to the upper end of a central support assembly through rod 19 which can, as shown in FIGURE II, be an integral part of the upper guy wire clamp 20. Connected together in the weighing pan support assembly is a center core or magnet 21, located within the force coil 14 and suitably connected to the lower guy wire clamp 22, which is in turn connected to a magnetic core or armature 23 located within the displacement sensor 18. The weighing pan support assembly may, if desired, be extended by rod 24 to a damper on the base 11.

In accordance with this invention, the weighing pan support assembly is maintained in the desired position with respect to the force coil and displacement sensor or to the load cell and prevented from any lateral movement while permitted limited vertical movement by the use of guy wires. The guy wires are attached to the central weighing pan support assembly and the structural frame of the weighing device in at least two, spaced, horizontal planes, for example, just above and below the force coil 14 in FIGURE I. A preferred arrangement of the guy wires and clamping means is illustrated in FIGURES I–III. In this arrangement, one piece of guy wire is strung back and forth between suitable clamping means on the rigid structural frame and on the vertically-movable weighing pan support assembly. The clamping means for securing the guy wires to the central weighing pan support assembly may, as illustrated in FIGURE II, comprise an upper plate 28 having an arm or rod 19 extending upwardly from the center thereof to which the weighing pan is attached and a lower plate 29 having an arm or rod 30 extending downwardly from the center thereof and terminating in a hemisphere 31 having a recess 32 therein into which the center core or magnet 21 is inserted and firmly cemented into place. Shallow recesses 33 are provided on the upper surface of the lower plate 29 and deeper recesses 34 are provided on the lower surface of the upper plate 28 in proper alignment with the recesses 33 for receiving bushings 35 with a sliding fit. Smaller apertures 36 and 37 are provided in the upper plate 28 and the bushing 35 respectively for passage of bolts or screws 39 into the threaded apertures 38 in the lower plate 29 to fasten the plates firmly to the guy wire which is strung successively from a clamp on the structural frame around a bushing in the central assembly guy wire clamp and out to the next guy wire clamp on the structural frame. The details of the lower guy wire clamp 22 are similar to those for upper guy wire clamp 20 with obvious modifications such as forming the upper plate like the lower plate of clamp 20 for attachment to the lower end of the center core or magnet 21 while the lower plate would have a rod or arm extending downwardly from its center of such a size and shape to have a recess therein into which the magnetic core 23 could be inserted and secured. The location of the threaded apertures may obviously be in either plate and is principally governed by ease of access to the bolts for adjustment. Clamping of the guy wires to the structural frame is achieved by cutting notches 41 in the rigid vertical members or corners posts 12 with small apertures 42 for passage of the guy wires therethrough. A clamp plate 43, which is machined for sliding fit in the notches in the corner posts, is provided with an aperture 44 in alignment with a shallow aperture 45 in the corner post 12 for receiving bushings 46. A small, threaded aperture 47 is provided in the corner post 12 in alignment with apertures of about the same size in the bushings 46 and clamp plate 43 for receiving bolt or screw 48 to secure the guy wires between clamp plate 43 and the corner post 12.

The several clamp plates and the damper rod 24 of the central weighing pan support assembly are made of any nonmagnetic material such as aluminum, brass, stainless steel or rigid plastics such as nylon. The center core or magnets 21 and 23 are firmly cemented with epoxy or other resin in the recesses therefor in the adjacent clamp plates and damper rod 24. The weighing pan support assembly, with the clamps loosely connected, is put into place in the structural frame with the center core or magnet 21 properly positioned in the force coil 14. The magnet 21 is anchored in place with removable shims or wedges while the guy wires are attached to the structural frame and the weighing pan support assembly.

Because of its high weight-strength ratio, wire ropes, preferably of stainless steel, is used for the guy wires of this invention. The number of strands and/or diameter and breaking strength of the wire rope will vary as the weighing range and the guy wire arrangement of the balance varies. For maximum sensitivity, the length of the guy wires, i.e., the distance between the structural frame clamps and the central support assembly clamps must be as long as possible and the guy wires must be as thin and flexible as possible. The size of the clamps 21 and 23 is ordinarily a compromise, i.e., as small as possible to maximize the length of the several guy wires, but large enough so that the radius from the axis of the center core or magnet 21 to the point at which the guy wires are clamped onto the support assembly is sufficient to resist rotary movement of the central assembly that tends to occur if the object being weighed is off-center of the weighing pan or is a live object that moves during the weighing procedure. For a balance weighing up to 100 grams with an accuracy of 0.001 g. a wire having a diameter of 0.0075 in. and a breaking strength of 9 lbs. can be used while in a balance weighing up to 5 kg. wires having a diameter of about 0.015 in. and a breaking strength of about 38 lbs. can be used. Wire ropes of comparable breaking strength to weighing range ratio would be used in balances for measuring larger weights. In view of the fact that in accordance with this invention there are at least three, and in the preferred embodiment there are eight guy wires in each of at least two spaced horizontal planes, it is obvious that the safety factor with such wire ropes is more than adequate.

To attach the guy wires to the weighing device of FIGURE I, one end of the wire rope is firmly attached to a corner post 12 by means of a ball terminal or the like fitted into a socket preferably in line with an aperture 42. The other end of the wire rope is then threaded through the aperture, thence around a bushing in the central assembly clamp plate and then through the apertures and around the bushing in the next corner post as shown at the top of FIGURE I. When properly threaded back to the starting corner post, the guy wire is drawn in it entirety or in successive stages until the desired uniform tension on the several guy wires is achieved whereupon the several bolts or screws are tightened to firmly hold the several guy wires in place by the clamps on the rigid vertical members or corner posts and the clamp on the central support assembly. The wedges or shims are then removed permitting the central support assembly to be suspended by the guy wires.

The weighing device is then activated in known manner as by supplying current to the zero coil 15 in the force coil to compensate for the weight of the weighing pan and the central support assembly therefor and thereby bring the displacement sensor 18 to zero or "null" position. When a weight is then placed on the weighing pan, the central weighing pan support assembly will attempt to fall thereby causing an offset voltage to appear at the output of the displacement sensor. This offset voltage is then amplified by a constant current amplifier causing a current to flow through the answer coil 16 in sufficient amount to drive the center core or magnet 21 back to the zero or "null" position. This current is directly proportional to the weight of the object placed on the pan and, when sampled across a sampling resistor may then be scaled for proper full scale value in a scaling amplifier and then displayed on a digital voltmeter and/or, if desired, recorded by means of conventional recording equipment.

The central weighing pan support assembly shown in FIGURE IV is a preferred embodiment of this invention for static or load cell weighing devices. In this arrangement the central weighing pan support assembly consists essentially of a hollow beam member 51 having upper and lower extensions or arms 52 and 53 to which clamps 54 and 55 respectively are attached. A rod 56 for supporting the weighing pan is attached to or is a part of the plate of clamp 54. A load cell or transducer 57 is attached to the horizontal beam 58 which is suspended from the structural frame of the weighing device or supported from the base by rigid vertical members (not shown). An aperture 59 is provided in extension 52 for the insertion of captive bolt 60 for attaching beam 51 to the transducer or load cell 57 and adjusting the tare position of the latter. In this embodiment, the details of the clamps 54 and 55 are essentially the same as those for the clamps 20 and 22 of FIGURE I and the wire rope is, of course, threaded between said clamps and clamps on the structural frame as described above. It is essential in this embodiment to have the extensions 52 and 53, rod 56 and weighing pan and the captive bolt 60 arranged symmetrically to the axis of beam 51. When an object to be weighed is placed on the weighing pan in this device, displacement of the central support assembly is transmitted to the transducer or load cell 57 producing an output signal which is directly proportional to the weight of the object and can be scaled, displayed and/or recorded as described above.

While the guy wire arrangement shown in the drawings is preferred since it is most effective for resisting rotary movement of the central support assembly and requires the use of only one piece of wire rope and thus only one tension adjustment, it will be understood that other arrangements can be used within the scope of this invention. For example, three or more separate guy wires may be attached to the central support assembly and the structural frame in each of two or more spaced horizontal planes by means of separate pieces of wire rope having suitable swaged or compressed fittings, preferably threaded sleeve type swaged fittings, at each end thereof. Such fittings permit one end of each guy wire to be fastened to a suitably threaded collar member on the central support assembly with the fitting at the other end passing through properly placed apertures in the structural frame. A nut, preferably a locknut may then be used to draw the fitting through the aperture to establish the desired tension on the guy wire and maintain the desired position of the weighing pan support assembly and associated movable parts within the structural frame and associated fixed position components of the weighing device. This arrangement is entirely adequate where there is no problem of off-center loading and particularly in weighing devices in which the weighing pan is suspended from the bottom of the central support assembly.

It will be understood that this invention is not limited to the specific embodiments described above since numerous modifications will occur to those skilled in this art.

What is claimed is:

1. In a beamless electrical weighing device comprising a rigid structural frame having a base with vertical support members attached thereto and a central assembly for supporting the weighing pan capable of limited vertical movement, when objects to be weighed are placed on said pan, to actuate displacement sensors which transform such vertical movement into an electrical signal which is directly proportional to the weight of the object placed on said pan, the improvement which consists essentially of attaching said central weighing pan support assembly to the rigid structural frame in at least two, spaced horizontal planes by means of at least three uniformly spaced guy wires in each of said planes whereby lateral movement of said central weighing pan support assembly is prevented, while limited vertical thereof responsive to the weight of the object placed on the weighing pan is permitted.

2. A weighing device as defined in claim 1 in which the guy wires in each plane consist of one piece of flexible wire rope which is strung back and forth between the structural frame and the central weighing pan support assembly from at least three, uniformly spaced clamping means on the structural frame to the same number of equally spaced clamping points on said weighing pan support assembly.

3. A weighing device as defined in claim 2 in which the clamping means on the structural frame consists essentially of a clamping plate fitted into a notch in said frame, a hollow cylindrical bushing, a shallow recess in said notch in the structural frame and a deeper recess in the clamping plate in alignment with said shallow recess, said recesses providing a sliding fit for said bushing, and screw means passing through the clamping plate and the bushing for rigidly securing the wire rope around said bushing and between the clamping plate and the structural frame.

4. A weighing device as defined in claim 2 in which the clamping means on the central weighing pan support assembly comprises an upper and a lower clamping plate, shallow recesses equal in number to the number of clamps on the structural frame uniformly spaced on the upper side of the lower clamping plate, a hollow cylindrical bushing for each of said recesses, deeper recesses on the bottom of the upper clamping plate for receiving the upper portion of said bushings, said recesses providing a sliding fit for said bushings and screw means passing through said upper clamping plate and bushings and into said lower clamping plate for rigidly securing the wire rope around each bushing and between said clamping plates by drawing the upper and lower clamping plates together.

5. A weighing device as defined in claim 2 in which the clamping means on the structural frame consists essentially of a clamping plate fitted into a notch in said frame, a hollow cylindrical bushing, a shallow recess in said notch in the structural frame and a deeper recess in the clamping plate in alignment with said shallow recess, said recesses providing a sliding fit for said bushings, screw means passing through the clamping plate and bushing and into the structural frame for rigidly securing the wire rope around said bushing and between the clamping plate and the structural frame and the clamping means on the central weighing pan support assembly comprises upper and lower clamping plates, shallow recesses equal in number to the number of clamps on the structural frame uniformly spaced on the upper side of the lower clamping plate, a hollow cylindrical bushing for each of said recesses, deeper recesses on the upper clamping plate for receiving the upper portion of said bushings, said recesses providing a sliding fit for said bushings and screw means passing through said upper clamping plate and bushings and into said lower clamping plate for rigidly securing the wire rope around each bushing and between said clamping plates by drawing the upper and lower clamping plates together.

6. A weighing device as defined in claim 1 in which the central weighing pan support assembly consists essentially of a hollow beam member having upper and lower extensions or arms to which the clamping means for securing the guy wires are attached, a load cell maintained in fixed position within the hollow portion of said beam and screw means at the axis of the hollow beam for attaching said beam to the top of said load cell.

7. A weighing device as defined in claim 6 in which the guy wires in each plane consist of one piece of flexible wire rope which is strung back and forth between the structural frame and the central weighing pan support assembly from at least three, uniformally spaced clamping means on the structural frame to the same number of equally spaced clamping points on said central weighing pan support assembly.

8. A weighing device as defined in claim 7 in which the clamping means on the structural frame consists essentially of a clamping plate fitted into a notch in said frame, a hollow cylindrical bushing, a shallow recess in said notch in the structural frame and a deeper recess in the clamping plate in alignment with said shallow recess, said recesses providing a sliding fit for said bushing, and screw means passing through the clamping plate and the bushing for rigidly securing the wire rope around said bushing and between the clamping plate and the structural frame.

9. A weighing device as defined in claim 7 in which the clamping means on the central weighing pan support assembly comprises an upper and a lower clamping plate, shallow recesses equal in number to the number of clamps on the structural frame uniformly spaced on the upper side of the lower clamping plate, a hollow cylindrical bushing for each of said recesses, deeper recesses on the bottom of the upper clamping plate for receiving the upper portion of said bushings, said recesses providing a sliding fit for said bushings and screw means passing through said upper clamping plate and bushings and into said lower clamping plate for rigidly securing the wire rope around each bushing and between said clamping plates by drawing the upper and lower clamping plates together.

10. A weighing device as defined in claim 7 in which the clamping means on the structural frame consists essentially of a clamping plate fitted into a notch in said frame, a hollow cylindrical bushing, a shallow recess in said notch in the structural frame, and a deeper recess in the clamping plate in alignment with said shallow recess, said recesses providing a sliding fit for said bushings, screw means passing through the clamping plate and bushings and into the structural frame for rigidly securing the wire rope around said bushing and between the clamping plate and the structural frame and the clamping means on the central weighing pan support assembly comprises upper and lower clamping plates, shallow recesses equal in number to the number of clamps on the structural frame uniformly spaced on the upper side of the lower clamping plate, a hollow cylindrical bushing for each of said recesses, deeper recesses on the upper clamping plate for receiving the upper portion of said bushings, said recesses providing a sliding fit for said bushings and screw means passing through said upper clamping plate and bushings and into said lower clamping plate for rigidly securing the wire rope around each bushing and between said clamping plates by drawing the upper and lower clamping plates together.

References Cited

UNITED STATES PATENTS

| 3,053,332 | 9/1962 | Buchtenkirch et al. | 177—210 XR |
| 3,142,349 | 7/1964 | Blodgett | 77—210 XR |
| 3,288,231 | 11/1966 | Hanne | 177—210 |

FOREIGN PATENTS

| 1,010,275 | 3/1952 | France. |
| 658,807 | 10/1951 | Great Britain. |
| 919,771 | 2/1963 | Great Britain. |

ROBERT S. WARD, JR., Primary Examiner

U.S. Cl. X.R.

177—231, 255